United States Patent [19]

Takashima et al.

[11] Patent Number: 5,740,518
[45] Date of Patent: Apr. 14, 1998

[54] FM CHARACTER DATA MULTIPLEX BROADCASTING SIGNAL RECEIVING APPARATUS

[75] Inventors: Susumu Takashima, Kokubunji; Kazuya Kawano, Tachikawa, both of Japan

[73] Assignee: Casio Computer Co., Ltd., Tokyo, Japan

[21] Appl. No.: 624,003

[22] Filed: Mar. 27, 1996

[30] Foreign Application Priority Data

Apr. 3, 1995 [JP] Japan ................... 7-077894

[51] Int. Cl.⁶ ................... H04B 1/00
[52] U.S. Cl. ................... 455/45; 455/186.1; 455/205; 455/166.1
[58] Field of Search ................... 455/45, 205, 186.1, 455/186.2, 182.1, 345, 152.1, 154.1, 160.1, 161.1, 161.3, 166.1, 166.2, 168.1, 176.1, 177.1, 179.1, 180.1, 188.1, 192.1, 185.1, 161.2; 381/2, 3, 4, 5, 7, 14; 370/343–344, 480–482, 485

[56] References Cited

U.S. PATENT DOCUMENTS

| | | |
|---|---|---|
| 4,236,251 | 11/1980 | Ohgishi et al. ................... 455/186.1 |
| 4,630,271 | 12/1986 | Yamada . | 
| 4,819,231 | 4/1989 | Yamada . |
| 5,432,800 | 7/1995 | Kuroda et al. . |
| 5,471,662 | 11/1995 | Shiota ................... 455/186.1 |
| 5,583,873 | 12/1996 | Miyake et al. ................... 455/154.1 |

FOREIGN PATENT DOCUMENTS

| | | | |
|---|---|---|---|
| 8-2044 | 1/1996 | Japan . | |
| 2240679 | 8/1991 | United Kingdom ................ 455/186.1 |

*Primary Examiner*—Reinhard J. Eisenzopf
*Assistant Examiner*—Doris To
*Attorney, Agent, or Firm*—Frishauf, Holtz, Goodman, Langer & Chick

[57] ABSTRACT

An FM broadcasting signal carrying multiplex character data transmitted from a radio broadcasting station is automatically preset in an FM receiving apparatus. An FM broadcasting signal is received, and a frequency information of the received FM broadcasting signal is temporarily memorized in a memory. It is judged whether a PLL lock signal is produced by a clock signal reproducing circuit during a demodulation process of the FM broadcasting signal whose frequency information is memorized in the memory. When it is determined that the PLL lock signal is produced by the clock signal reproducing circuit, it is determined that the FM broadcasting signal carries multiplex character data, and the frequency information of said FM broadcasting signal is preset to the FM receiving apparatus.

6 Claims, 9 Drawing Sheets

BIC1 : 0001 0011 0101 1110

BIC2 : 0111 0100 1010 0110

BIC3 : 1010 0111 1001 0001

BIC4 : 1100 1000 0111 0101

TRANSMISSION ORDER ⟶

BIT PATTERN OF BLOCK
IDENTIFICATION CODE

FIG.6

STRUCTURE OF CODE

FM CHARACTER DATA MULTIPLEX BROADCASTING SIGNAL RECEIVING APPARATUS

BACKGROUND OF THE INVENTION

1. Field of the Invention

The present invention relates to an FM broadcasting signal receiving apparatus for receiving an FM broadcasting signal carrying multiplex character data, and a method of automatically presetting an FM broadcasting signal carrying multiplex character data to the FM broadcasting signal receiving apparatus.

2. Description of the Prior Art

In recent, such broadcasting service has been available that carries multiplex character information in addition to voice information. FIG. 7 is a view showing the principle of the conventional FM character data multiplex broadcasting system for providing the above broadcasting service.

As shown in FIG. 7, from a right channel audio signal (L-signal) and a left channel audio signal (R-signal) are produced a sum signal, (L+R) signal (a main channel signal) and a difference signal (L–R) signal. The sum signal, (L+R) signal and the difference signal (L–R) signal are restricted within a frequency range of 15 KHz. A carrier signal of 38 KHz, which has a frequency (2 pf) two times a frequency (pf) of a pilot signal, is subjected to a carrier suppressed amplitude modulation to produce a sub-channel signal. Then, the main channel signal, the pilot signal of 19 KHz and the sub-channel signal are added together to produce a stereo composite signal for the FM stereo broadcasting service.

Meanwhile, a multiplex signal is restricted within a base frequency range (53 KHz to 100 KHz). A subcarrier frequency of 76 KHz (4 pf), which is four times the pilot frequency (pf), is subjected to an Level controlled Minimum Shift Keying (L-MSK) modulation to produce a stereo composite signal with multiplex signal. As described, the main channel signal, the pilot signal, the sub-channel signal and the subcarrier frequency signal (multiplex signal) are added together to produce a sum signal, and the carrier frequency of a predetermined frequency is frequency-modulated with the sum signal to produce the FM multiplex broadcasting signal.

In case that the difference audio signal, (L–R) signal, is modulated at a high modulation factor, the multiplex signal is interfered to a considerable degree by the difference audio signal. On the other hand, in case that the audio signal is modulated at a low modulation factor, interference noises to the audio signal are remarkable. Therefore, as shown in FIG. 8, the modulation factors, at which the multiplex signal is subjected to the L-MSK modulation, vary from 4% to 10% responding to the modulation factors, 2.5% to 5%, for the difference audio signal (L–R) signal. Detailed description of the above modulation system is given in Japanese Patent Publication, Tokko-Hei 8-2044.

A transmission capacity of the multiplex signal is 16 kbps. A capacity of 6.83 kbps among the capacity of 16 kbps. is used for transmitting data, and the remaining, 9.17 kbps. is used for error correction.

The error correction uses a production code ((272,190) shortened difference set cyclic code) obtained by breaking down a single code to symbol codes to symbols which are arranged in horizontal and vertical directions, as shown in FIG. 9. The details thereof are disclosed in U.S. Pat. Nos. 4,630,271, 4,819,231 and 5,432,800.

Using the character multiplex broadcasting system, one broadcasting station can provide 256 broadcasting programs at maximum. One broadcasting program consists of 64 pages at maximum as shown in FIG. 10. The programs are supplemental programs relating to a main audio program such as addresses to which requests should be sent by audiences, titles of music, and names of artists and independent programs independent of the main audio program such as weather forecasts, and traffic information.

Conventional FM receivers have an automatically presetting function of searching for and presetting available broadcasting stations. The FM broadcasting station does not always supply FM multiplex broadcasting programs. Therefore, even though desiring to enjoy an FM multiplex broadcasting program, audiences can not help often receiving an FM broadcasting program carrying no multiplex information.

SUMMARY OF THE INVENTION

The present invention has been made to overcome the above mentioned inconvenience in the conventional FM receivers, and has an object to provide an FM character data multiplex broadcasting signal receiving apparatus, in which only FM broadcasting stations that are providing multiplex programs are automatically preset therein, and with which an audience can select the broadcasting station to enjoy the multiplex program. Another object of the present invention is to provide a method of automatically presetting such FM broadcasting stations in an FM receiver.

According to one aspect of the invention, there is provided an FM broadcasting signal receiving apparatus for receiving an FM broadcasting signal carrying multiplex character data, which receiving apparatus comprises:

receiving means adapted to be preset with a frequency information representing a frequency of an FM broadcasting signal, for receiving an FM broadcasting signal;

a memory for searching for an FM broadcasting signal which can be received by said receiving means, and for storing a frequency information representing a frequency of the searched FM broadcasting signal;

judging means for judging whether the FM broadcasting signal, the frequency information of which is stored in said memory, carries multiplex character data; and presetting means for, when said judging means judges that said FM broadcasting signal carries multiplex character data, presetting to said receiving means the frequency information representing the frequency of said FM broadcasting signal judged by said judging means to be carrying the multiplex character data.

BRIEF DESCRIPTION OF THE DRAWINGS

Other objects and structures of the present invention will be more fully understood from the description, when taken in conjunction with the accompanying drawings, in which:

FIG. 6 is a view showing bit patterns of BIC1–BIC4 in frame data of FIG. 5;

DETAILED DESCRIPTION OF PREFERRED EMBODIMENTS

Now, preferred embodiments of an FM broadcasting signal receiving apparatus (hereafter sometimes, FM receiver) of the present invention for receiving an FM character multiplex broadcasting program using a Data Radio Channel System (DARC) will be described with reference to the accompanying drawings.

Figure 1:
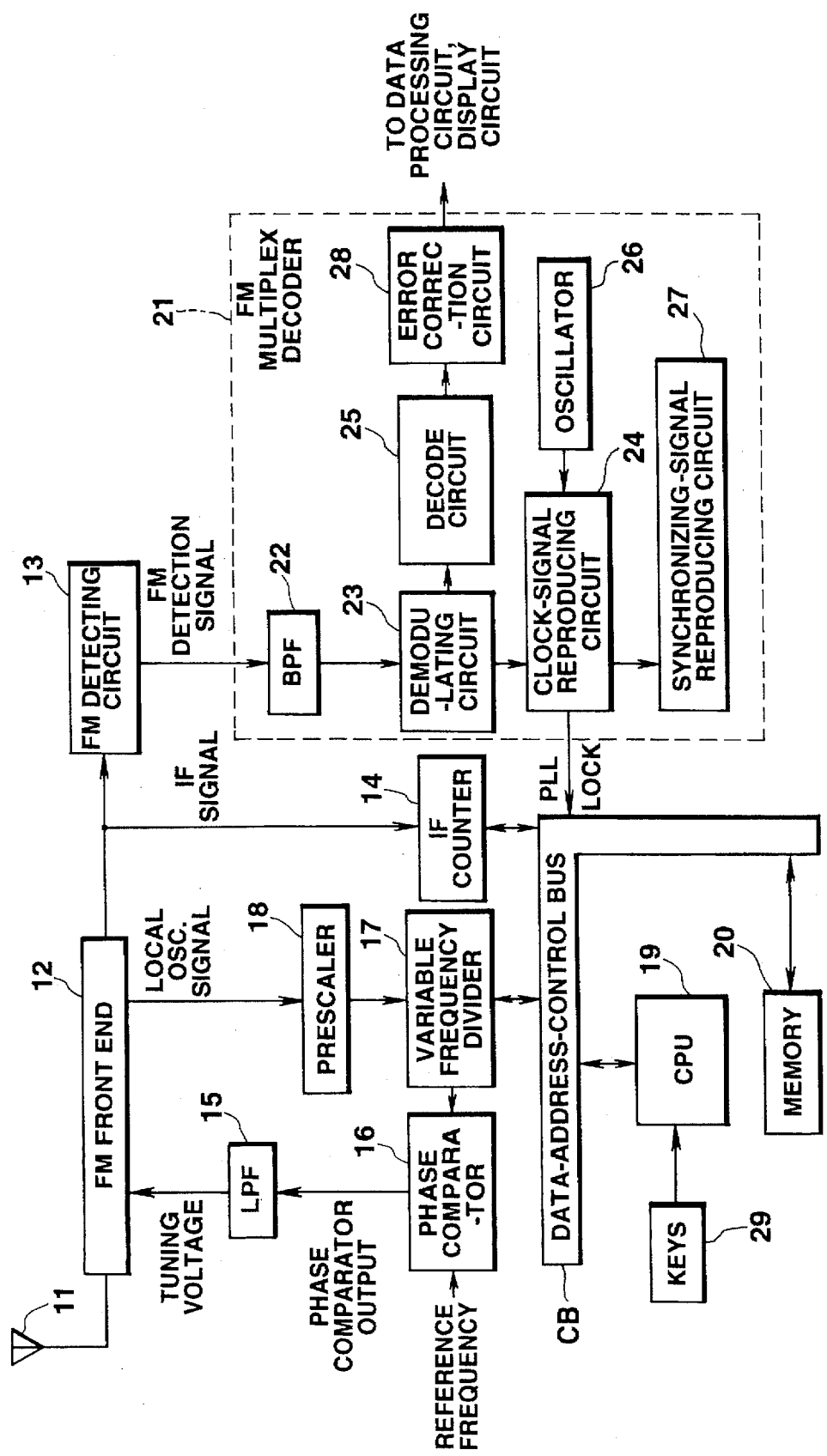
FIG. 1 is a circuit diagram of an embodiment of an FM broadcasting signal receiving apparatus of the present invention.

FIG. 1 is a circuit diagram of the embodiment of the FM receiver of the present invention. A reference 11 denotes an antenna, which is connected to an FM front end 12 of the FM receiver. The FM front end 12 of the FM receiver comprises a high frequency amplifier, a mixing circuit and a local oscillator. An FM broadcasting signal is supplied to the high frequency amplifier through the antenna 11, and is amplified therein. The amplified FM broadcasting signal is mixed with a local oscillator signal generated by the local oscillator to generate an intermediate frequency signal (IF signal). The generated IF signal is further supplied to an FM detecting circuit 13 and also to an IF counter 14.

The local oscillator in the FM front end 12 is combined with a low pass filter (LPF) 15, a phase comparator 16, a variable frequency divider 17 and a prescaler 18 to constitute a phase locked loop circuit (PLL circuit). The local oscillator signal of the local oscillator is frequency-divided by the prescaler 18, and further is frequency-divided by a value previously calculated from the frequency of the local oscillator by the variable frequency divider 17 such that the frequency divided signal coincides with a reference frequency signal. The frequency divided signal is sent to the phase comparator 16.

The phase comparator 16 compares the phase of the signal received from the variable frequency divider 17 with that of the reference frequency signal to supply a signal proportional to the phase difference to the low pass filter 15. A tuning voltage signal with high frequency components attenuated is supplied to the FM front end 12 from the low pass filter 15. The frequency of the local oscillation signal is directly controlled.

The IF counter 14 performs a counting operation depending on the intermediate frequency signal sent from the FM front end 14, and a value counted by the IF counter 14 is sent to a central processing unit (CPU) 19 via a data-address-control bus CB. The CPU 19 controls operations of entire circuits of the FM receiver. The data-address-control bus CB is connected with a memory 20, which stores various data used when the CPU 19 performs control operation upon receipt of a key input.

The FM detecting circuit 13 discriminates the IF signal sent from the FM front end 12 to obtain an FM detection signal, and supplies same to a band pass filter (BPF) 22.

The BPF 22 allows only a frequency band of a sub carrier frequency of 76 Khz included in the FM detection signal to pass through to a demodulating circuit 23, on which frequency band digital data is multiplexed.

The demodulating circuit 23 executes a delay detection on the output signal of the BPF 22 depending on a modulation factor of a stereo audio signal modulated based on L-MSK system to demodulate the digital data. The demodulated digital data is supplied to a clock signal reproducing circuit 24 and to a decode circuit 25.

The clock signal reproducing circuit 24 compares the phase of the digital data sent from the demodulating circuit 23 with a phase of a clock signal generated by an oscillator 26 to reproduce a digital-PLL clock signal in synchronism with the digital data.

More specifically, a count value of an internal counter is compensated depending on changing points of the digital data during a process in which the internal counter frequency-divides a clock signal of integral multiples of a bit rate of the clock signal generated by the oscillator 26, whereby the clock signal is reproduced which has a phase for allowing a sampling operation to be effected at respective centers of bits of the digital data. The reproduced clock signal is sent to a synchronizing-signal reproducing circuit 27.

Judging that the phase of the received digital data coincides with that of the reproduced clock signal, when the phase of the reproduced clock signal is held at centers of the bits of the received digital data for a certain time period, the clock signal reproducing circuit 24 sends out the digital-PLL clock signal to the data-address-control bus CB outside an FM multiplex decoder.

The synchronizing-signal reproducing circuit 27 samples the digital data using the reproduced clock signal to detect block identification codes (BIC) attached to leading portions of respective data blocks (packets) in the data. Then, the synchronizing-signal reproducing circuit 27 produces a block synchronizing signal in synchronizing with the data blocks in the data based on the detected BIC. Further, the synchronizing-signal reproducing circuit 27 detects changing points of sorts of the BIC, thereby producing a frame synchronizing signal. The clock synchronizing signal and the frame synchronizing signal produced by the synchronizing-signal reproducing circuit 27 are supplied to the decode circuit 25 and to a data processing circuit in a following stage (not shown).

The data decode circuit 25 releases a scramble over the digital data based on the frame synchronizing signal supplied from the synchronizing-signal reproducing circuit 27, and sends same to an error correction circuit 28.

The error correction circuit 28 corrects errors included in the received digital data, and further checks the received digital data with respect to a cyclic redundancy code (CRC), and, thereafter, sends the digital data to the data processing circuit in the following stage and to a data displaying circuit (not shown) outside the FM multiplex decoder 21.

Now, operation of the embodiment of the FM receiver of the present invention will be described.

Figure 2:
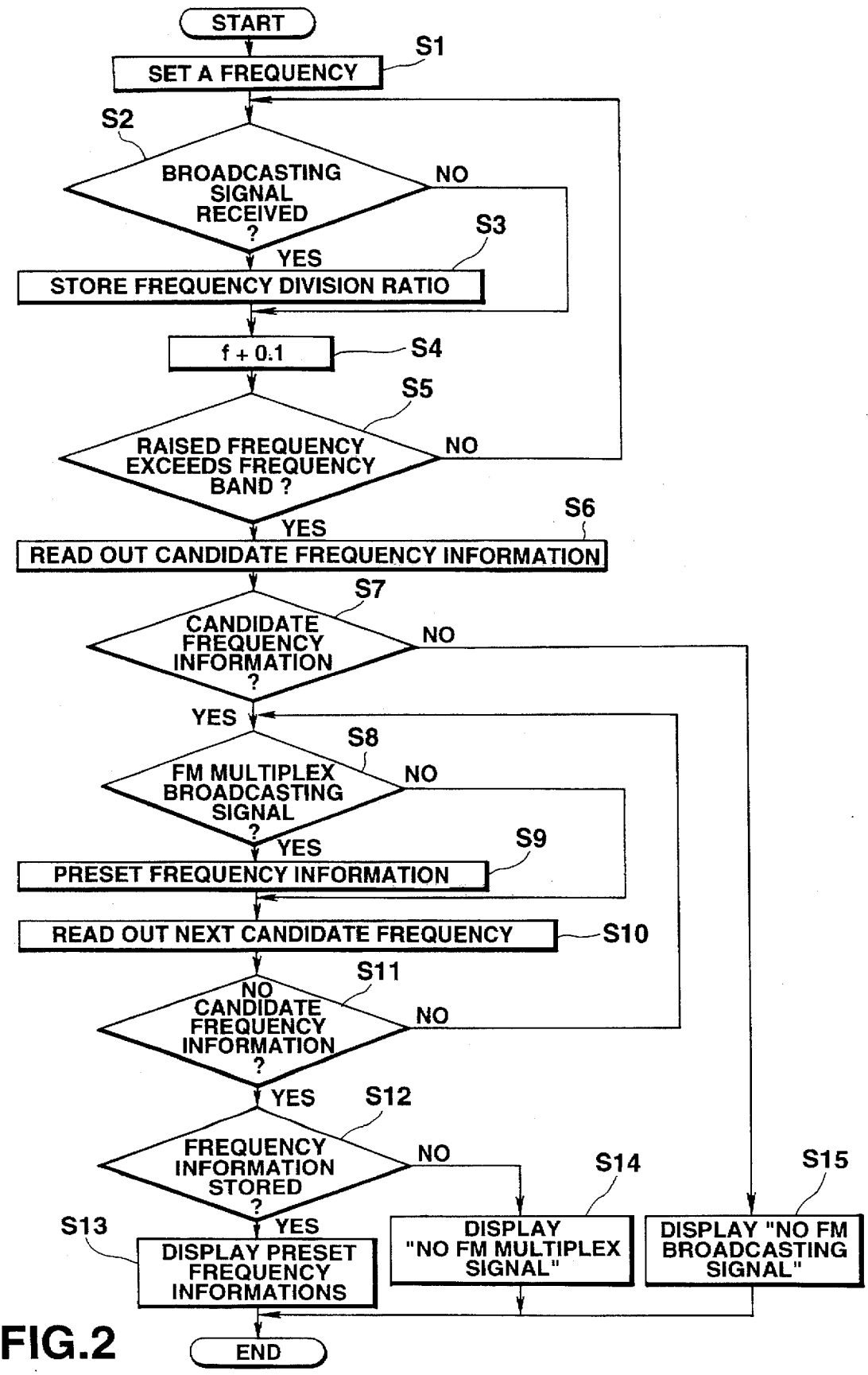
FIG. 2 is a flowchart of operation of the embodiment of the FM broadcasting signal receiving apparatus.

FIG. 2 is a flowchart of a preset operation performed mainly by the CPU 19 to preset FM character multiplex broadcasting stations. Receiving an instruction of "preset", the CPU 19 controls a frequency division ratio of the variable frequency divider 17 in accordance with a receiving FM broadcasting frequency band of 76–90 MHz at step S1 of FIG. 2 to set a frequency to be received by the FM front end 12 to a start frequency of 76 MHz. The CPU 19 judges whether the count value of the IF counter 14 at the start frequency in a predetermined period will become a predetermined value. The CPU 19 further judges depending on the result of the judgement at step S2 whether the FM broadcasting audio signal is being received.

Only when the CPU 19 determines at step S2 that the FM broadcasting audio signal is being received, information of the frequency division ratio of the variable frequency divider 17 at the time is stored in a memory 20 at step S3 as information of a received frequency of an FM audio broadcasting station, in other words, as information of a received frequency (hereafter, candidate frequency information) of an FM broadcasting station which might provide an FM character multiplex broadcasting program.

Thereafter, the frequency division ratio of the variable frequency divider 17 is changed at step S4 such that a frequency received by the FM front end 12 raises by 0.1 MHz, which is the least step of a receiving FM broadcasting frequency. Confirming at step S5 that the raised frequency does not exceed the receiving frequency band, the processes at steps S2 to S5 are repeatedly executed.

As described above, changing successively the frequency division ratio of the variable frequency divider 17, the CPU 19 changes the frequency to be received by the FM front end 12. When the count value of the IF counter 14 becomes the predetermined value, the CPU 19 determines that the FM front end 12 is receiving an FM broadcasting signal. When the CPU 19 determines that the FM front end 12 is receiving an FM broadcasting signal, the frequency division ratio of the variable frequency divider 17 is stored in the memory 20 as the candidate frequency information.

When the CPU 19 determines at step S5 that the receiving frequency exceeds the receiving frequency band, a searching operation for searching for an FM broadcasting station which is providing an FM audio broadcasting program is finished. Then, the first one candidate frequency information is read out from the memory 20 at step S6. The CPU 19 judges at step S7 whether the candidate frequency information has been reads out from the memory 20. When no candidate frequency has been read out from the memory 20, the CPU 19 controls the display circuit in the following stage to display, for instance, a message of "NO FM PROGRAM IS RECEIVED". Then, the preset operation of FIG. 2 is finished.

When a candidate frequency information has been read out from the memory 20, the CPU 19 controls the FM front end 12 to receive an FM audio broadcasting program of the candidate frequency information based on the information of the candidate frequency, i.e., based on the frequency division ratio of the variable frequency divider 17. Then, the CPU 19 judges whether the clock signal reproducing circuit 24 within the FM multiplex decoder 21 generates a PLL lock signal. When the clock signal reproducing circuit 24 generates a PLL lock signal, the CPU 19 determines at step S8 that the FM front end 12 has been receiving an FM character data multiplex broadcasting signal at the receiving frequency.

More specifically, when clocks of the clock signal reproduced by the clock signal reproducing circuit 24 are fixed at centers of bits of the received digital data respectively for a predetermined time, the CPU 19 determined that the received digital data and the produced clock signal coincide in phase with each other. Only when it is determined that the received digital data and the produced clock signal coincide in phase with each other, the clock signal reproducing circuit 24 produces the PLL lock signal. Therefore, only when the PLL lock signal is produced, it is determined that the FM character multiples broadcasting signal has being received.

When it is determined that the FM character multiples broadcasting signal has being received, the candidate frequency information at the time is set to the memory 20 at step S9 as information to be preset therein.

Thereafter, the next candidate frequency information is searched for in the memory 20. When it is confirmed at step S11 that the information of the next candidate frequency has been stored in the memory 20, the operation returns to step S8 and processes at steps S8–S11 are executed again. That is, the FM front end is made to receive the FM character multiples broadcasting signal is based on the read out the candidate frequency information. When the FM character multiplex broadcasting signal has been received, the candidate frequency information at the time is preset to the memory 20.

While the above processes at steps S8–S11 are repeatedly executed, the candidate frequencies information are successively stored in the memory 20. When the it is determined at step S11 that there is no candidate frequency information, the preset operation for previously setting in the memory 20 the FM broadcasting station which is transmitting the FM character multiplex broadcasting program is finished.

Thereafter, it is judged at step S12 whether informations of receiving frequencies of FM character multiplex broadcasting stations have been stored in the memory 20. When it is determined at step S12 that the informations of receiving frequencies of FM character multiplex broadcasting stations have been stored in the memory 20, the display circuit in the following stage displays at step S12 a message representing that "MF character multiples broadcasting stations: 3

1: FM-A station, 2: FM-B station, 3: FM-C station."
Then, the preset operation of FIG. 2 is finished.

When it is determined at step S12 that no information of receiving frequencies of FM character multiplex broadcasting stations has been stored in the memory 20, the display circuit in the following stage displays at step S14 a message representing that "No MF character multiplex broadcasting station available." Then, the preset operation of FIG. 2 is finished.

In the present embodiment of the invention, it is judged depending on the PLL lock signal to be produced by the clock signal reproducing circuit 24, whether or not an FM character multiplex broadcasting program is available. However, it may be judged depending on a particular code included in data to be reproduced, whether or not an FM character multiplex broadcasting program is available. In this case, it may be avoided that, even though the clock signal is reproduced, characters are not displayed due to lack of data, and it is possible to preset only the FM broadcasting stations, which transmit character information that can be displayed.

Figure 3:
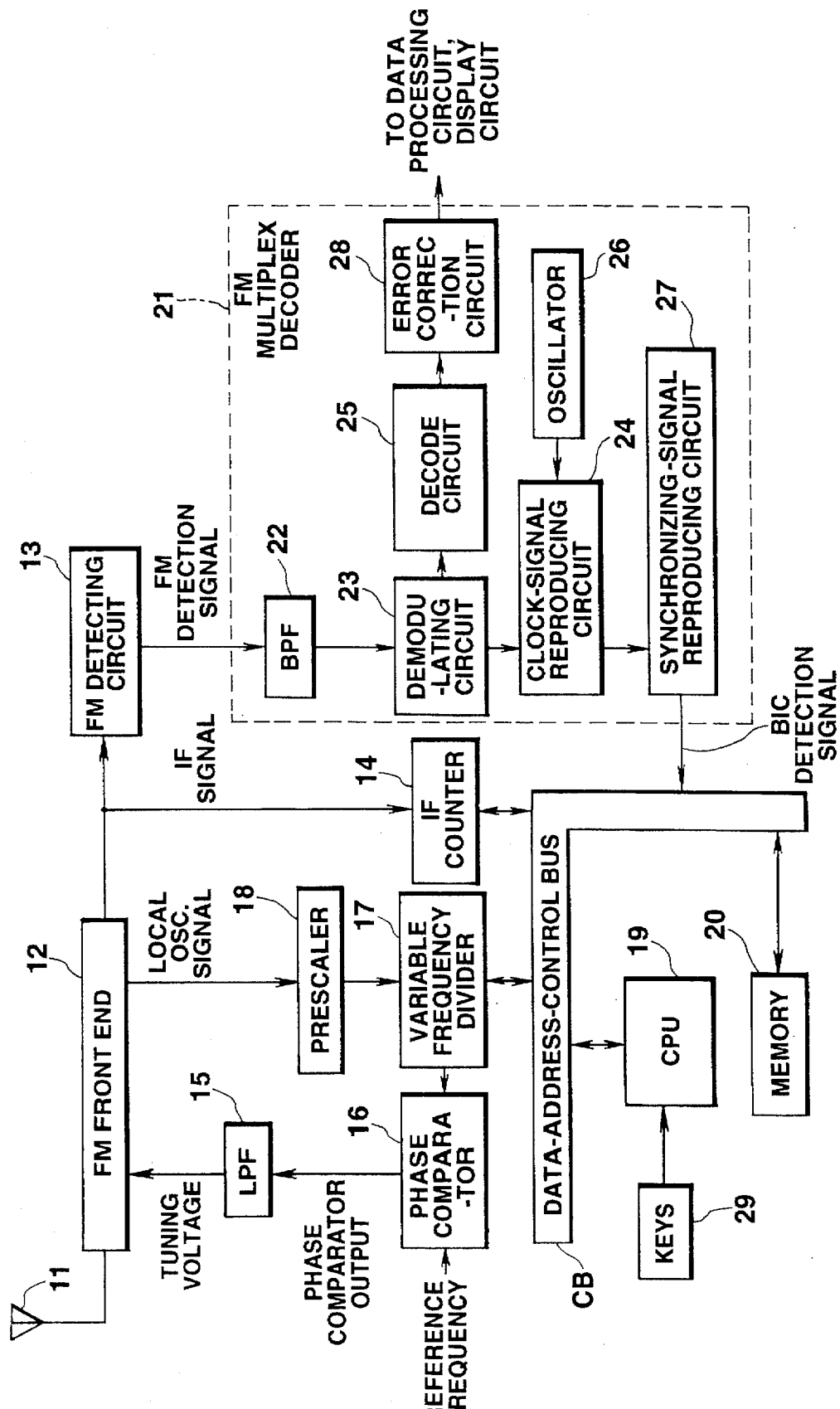
FIG. 3 is another circuit diagram of the embodiment of the FM broadcasting signal receiving apparatus of the invention.

FIG. 3 is a circuit diagram of another embodiment of the FM receiver of the present invention. In FIG. 3, like elements as those in FIG. 1 are designated by like reference numerals, and their description will be omitted. But, the clock signal reproducing apparatus 24 of the present embodiment sends the reproduced clock signal together with the digital data only to the synchronizing-signal reproducing circuit 27 but not to data-address-control bus CB. The PLL lock signal is not sent outside the FM multiplex decoder 21.

The synchronizing-signal reproducing circuit 27 samples the received digital data using the clock signal sent from the clock signal reproducing circuit 24 to detect BIC of the block data (packet) included in the sampled data. The synchronizing-signal reproducing circuit 27 produces based on the detected BIC a block synchronizing signal which is in synchronism with the block data in the sampled data. Further, the synchronizing-signal reproducing circuit 27 detects changing points of sorts of BIC to produce a frame synchronizing signal. The produced block synchronizing signal and frame synchronizing signal are supplied to the data decode circuit 25 and further to a data processing circuit and a display circuit in the following stage. The detected BIC, which is used to judge whether an FM character multiplex broadcasting signal is available, is sent to the CPU 19 through the data-address-control bus CB.

Figure 4:
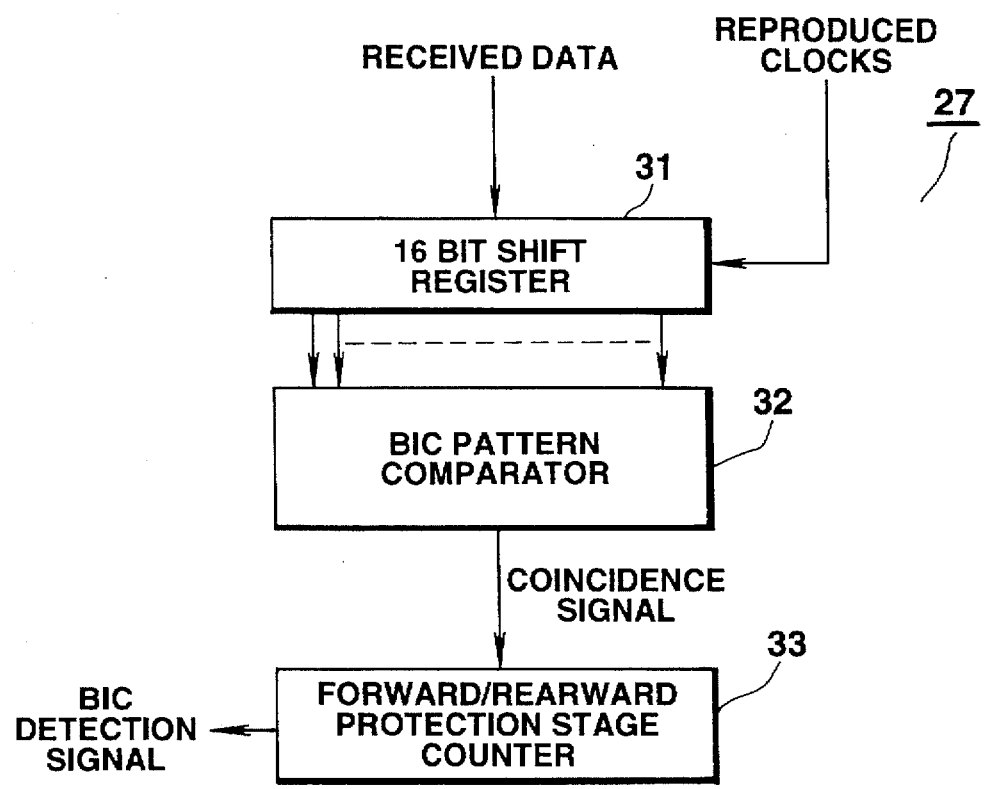
FIG. 4 is a block diagram of a BIC detecting circuit in a synchronizing signal reproducing circuit of FIG. 3.

FIG. 4 is a view showing a structure of a BIC detecting circuit within the synchronizing-signal reproducing circuit 27. The digital data sampled in the synchronizing-signal reproducing circuit 27 are supplied to a shift register 31 of 16 bits. The shift register 31 successively holds sets of predetermined number of digital data based on the clock signal reproduced by the clock signal reproducing circuit 24 to convert digital data in series into the digital data in parallel, and sends the converted digital data in parallel (contents held therein) to a BIC pattern comparator 32.

The BIC pattern comparator 32 compares the contents held in the shift register 31 with a predetermined bit pattern of BIC. When both coincides with each other, the BIC pattern comparator 32 sends a coincidence signal to a forward/rearward protection stage counter 33.

The forward/rearward protection stage counter 33, in which a number of protection stages are previously set before and after the synchronization of block data, generates a BIC detection signal when a number of coincidence signals sent from the BIC pattern comparator 32 are input thereto continuously at the timings of the block synchronization, which number is equivalent to the previously set number of the protection stages.

Now, operation of the BIC detecting circuit within the synchronizing-signal reproducing circuit 27 will be described.

Figure 5:
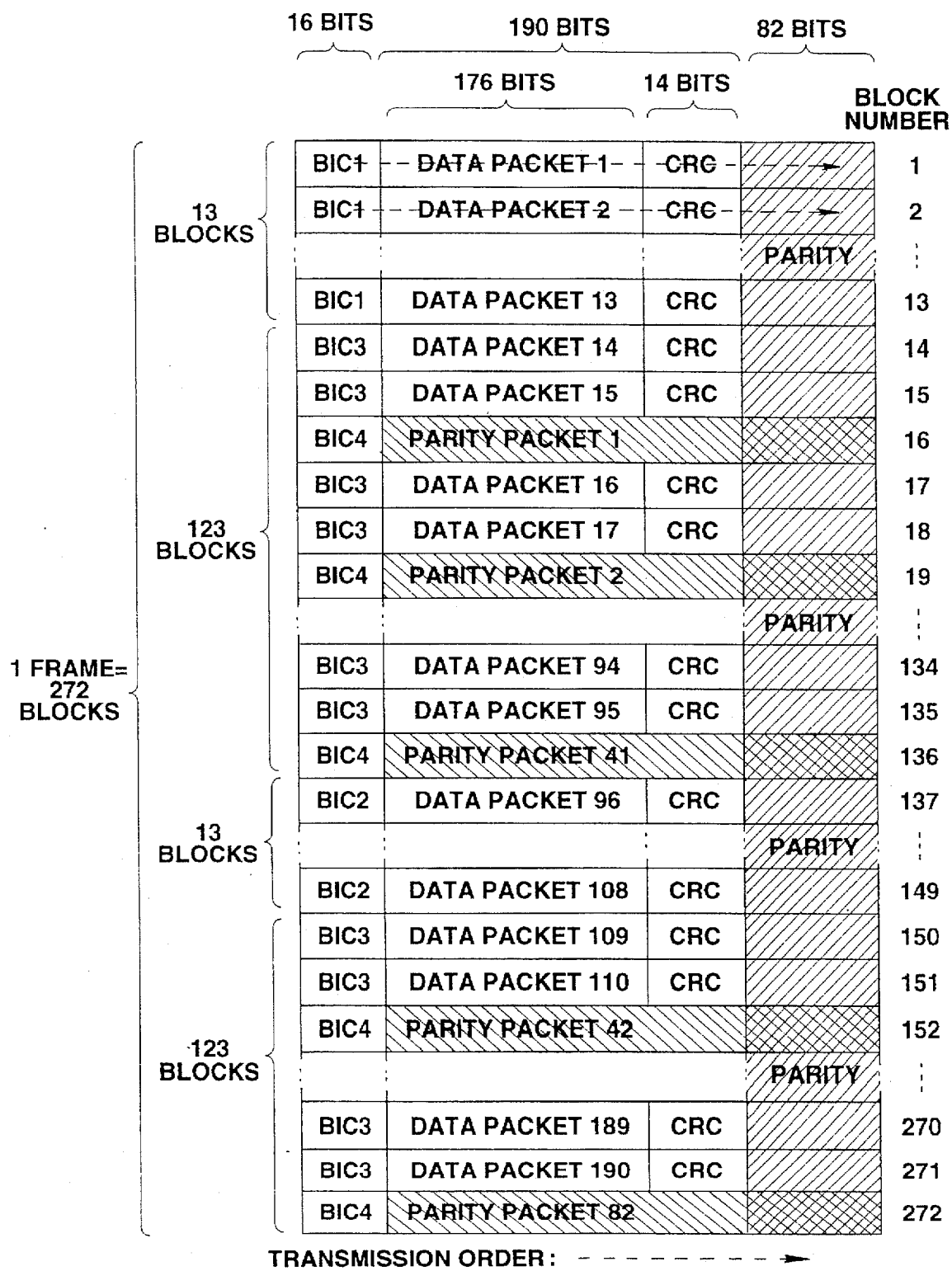
FIG. 5 is a view showing a structure of frame data of an FM character multiplex broadcasting signal in the embodiment of the FM broadcasting signal receiving apparatus.
Figure 7:
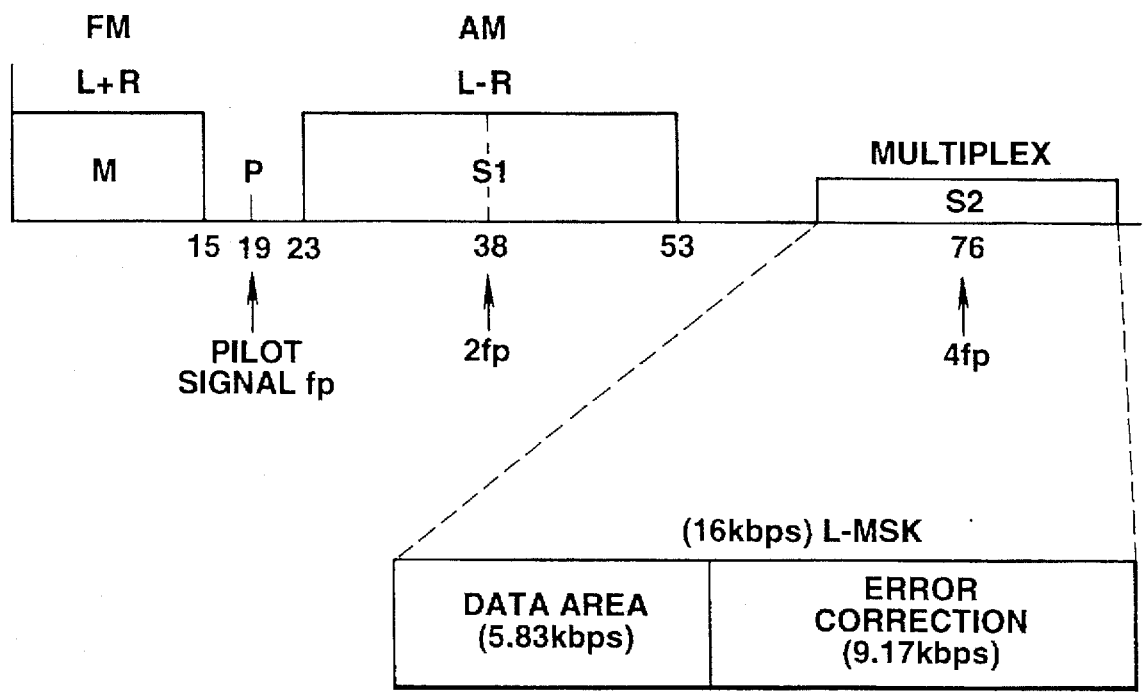
FIG. 7 is a view showing a spectrum of an FM character data multiplex broadcasting signal.
Figure 8:
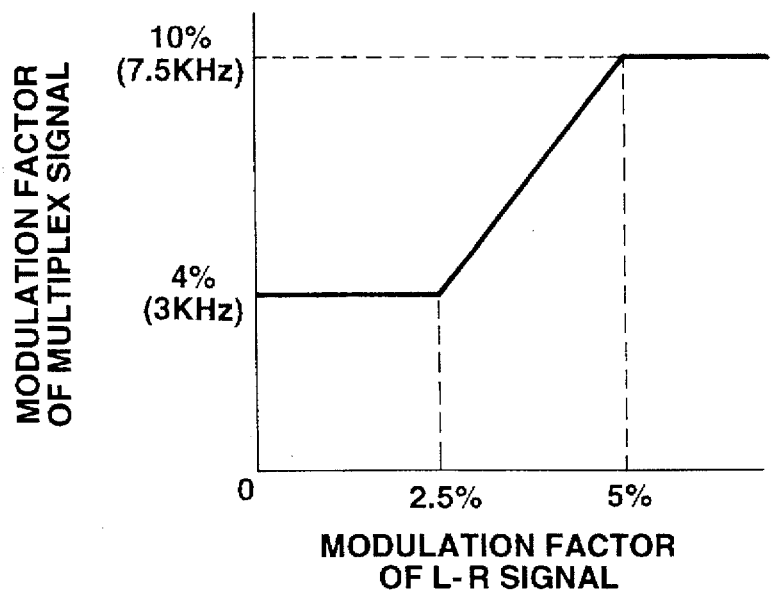
FIG. 8 is a view explaining L-MSK modulation.
Figure 9:
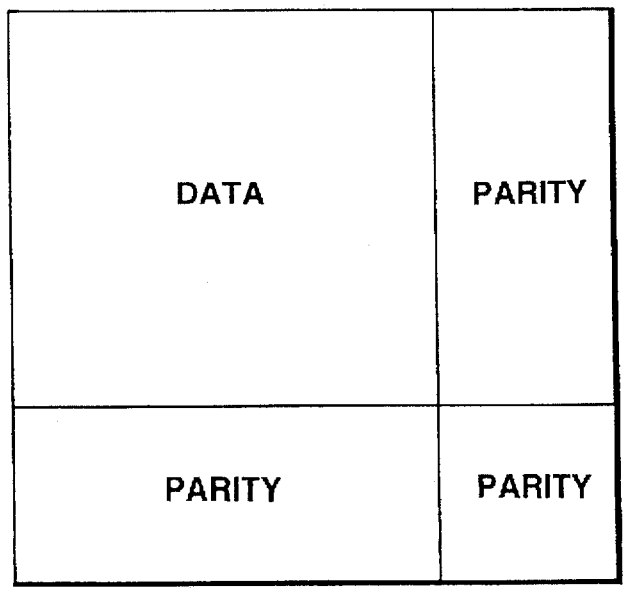
FIG. 9 is a view explaining a production code of an error correction.
Figure 10:
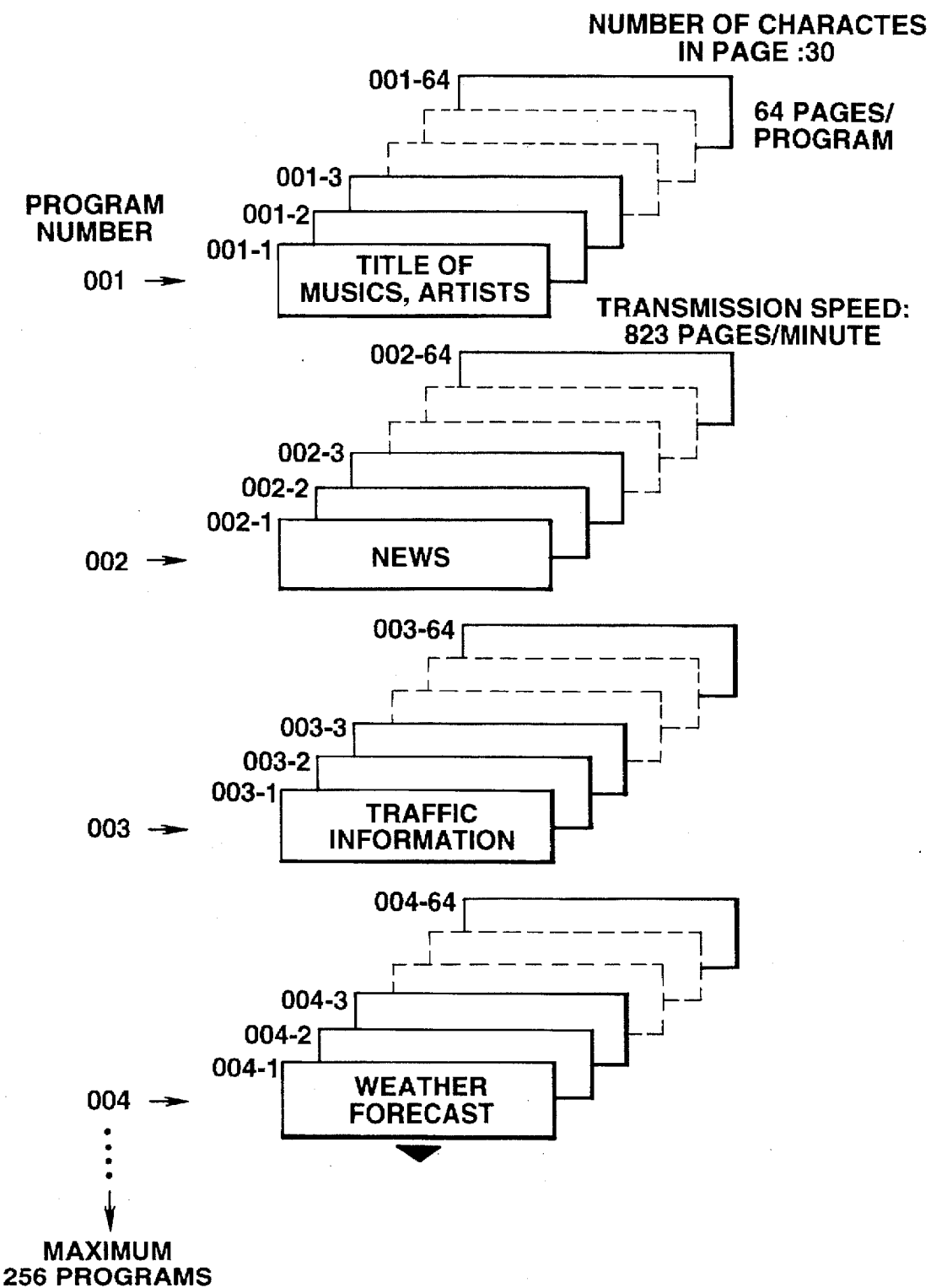
FIG. 10 is a view showing multiplex character programs.

FIG. 5 is a view showing a structure of a frame of the FM multiplex broadcasting signal. Each frame includes 272 blocks, and each block has a block identification code, i.e., a BIC of 16 bits, at the leading portion thereof. The BIC is used for establishing the block synchronization and the frame synchronization. 190 blocks among the 272 blocks are used as data packets for transferring data, and another 82 blocks are used as parity packets for transferring parities in a column direction. The 82 blocks of parity packets each represent parity in a row direction of all the data packet, and are dispersed for coping with burst errors.

The bit patterns of the BIC are shown in FIG. 6, and represent change in contents of the packets, a timing of a frame end, and a timing of a start of a new frame, when four sorts of BICs (BIC1, BIC2, BIC3 and BIC4) are changed.

The BIC pattern comparator 32 within the synchronizing-signal reproducing circuit 27 compares a bit pattern of the digital data held in the shift register 31 with the bit patterns of the four sort of BICs (BICs (BIC1, BIC2, BIC3 and BIC4), and outputs a coincidence signal to the forward/rearward protection stage counter 33, when the bit pattern of the digital data coincides with any one of the bit patterns of the BICs.

When continuously receiving a predetermined number of the coincidence signals from the BIC pattern comparator 32 at timings of the block synchronization, the forward/rearward protection stage counter 33 determines that BIC has been found and outputs the BIC detection signal.

By using the BIC detection signal to judge whether an FM character multiplex broadcasting program is available, the FM broadcasting station which transmits character data that can be displayed, can be previously set.

In the embodiment, the present invention which is applied to the FM receiver for receive the FM character multiplex broadcasting signal of the DRAC system has been described, but the present invention may be applicable to an FM receiver for receiving a multiplex broadcasting signal of another system.

What is claimed is:

1. An FM broadcasting signal receiving apparatus for receiving an FM broadcasting signal carrying multiplex character data, the multiplex character data including block identification codes and control codes, the receiving apparatus comprising:

receiving means adapted to be preset with a frequency information representing a frequency of an FM broadcasting signal, for receiving an FM broadcasting signal;

a memory for searching for an FM broadcasting signal which can be received by said receiving means, and for storing a frequency information representing a frequency of the searched FM broadcasting signal;

judging means for judging whether the FM broadcasting signal, the frequency information of which is stored in said memory, carries multiplex character data; and presetting means for, when said judging means judges that said FM broadcasting signal carries multiplex character data, presetting to said receiving means the frequency information representing the frequency of said FM broadcasting signal judged by said judging means to be carrying the multiplex character data.

2. An FM broadcasting signal receiving apparatus as claimed in claim 1, further comprising:

demodulating means for demodulating the FM broadcasting signal received by said receiving means, and wherein:

said judging means comprises:

first means for detecting block identification codes included in the multiplex character data of the FM broadcasting signal demodulated by said demodulating means, and for producing bit synchronizing signals based on the detected block identification codes; and second means for determining that the FM broadcasting signal carries multiplex character data, when the bit synchronizing signals have been produced by said first means.

3. An FM broadcasting signal receiving apparatus as claimed in claim 1, further comprising:

demodulating means for demodulating the FM broadcasting signal received by said receiving means, and wherein:

said judging means comprises:

third means for judging whether control codes are included in the FM broadcasting signal which has been demodulated by said demodulating means; and fourth means for determining that the FM broadcasting signal carries multiplex character data, when said third means determines that the control codes are included in the FM broadcasting signal demodulated by said demodulating means.

4. In an FM broadcasting signal receiving apparatus for receiving an FM broadcasting signal carrying multiplex character data, a method of presetting a frequency information of an FM broadcasting signal which can be received by said receiving apparatus, comprising the steps of:

searching for an FM broadcasting signal which can be received by said receiving apparatus;

demodulating the searched FM broadcasting signal;

storing a frequency information representative of a frequency of the demodulated FM broadcasting signal;

judging whether the demodulated FM broadcasting signal, the frequency information of which is stored, carries multiplex character data; and presetting, when it is determined that said demodulated FM broadcasting signal carries multiplex character data, to said receiving apparatus, the stored frequency information of said FM broadcasting signal.

5. A method of presetting a frequency information of an FM broadcasting signal which can be received by said receiving apparatus, as claimed in claim 4, wherein said judging step comprises steps of:

detecting block identification codes included in the demodulated FM broadcasting signal;

producing bit synchronizing signals based on the detected block identification codes; and determining that the demodulated FM broadcasting signal carries multiplex character data, when the bit synchronizing signals have been produced.

6. A method of presetting a frequency information of an FM broadcasting signal which can be received by said receiving apparatus, as claimed in claim 5, wherein said judging step comprises steps of:

judging whether control codes are included in the demodulated FM broadcasting signal; and determining that the demodulated FM broadcasting signal carries multiplex character data, when it is determined that the control codes are included in the demodulated FM broadcasting signal.

\* \* \* \* \*